(12) United States Patent
Hock

(10) Patent No.: US 7,595,995 B2
(45) Date of Patent: Sep. 29, 2009

(54) CABINET FOR RECEIVING AND CHARGING POWER TO NOTEBOOK COMPUTERS

(76) Inventor: Koh Tuang Hock, 235 Chung-Ho Box 8-24, Taipei (TW)

( * ) Notice: Subject to any disclaimer, the term of this patent is extended or adjusted under 35 U.S.C. 154(b) by 92 days.

(21) Appl. No.: 11/776,546

(22) Filed: Jul. 11, 2007

(65) Prior Publication Data

US 2009/0016008 A1      Jan. 15, 2009

(51) Int. Cl.
*H05K 5/00* (2006.01)
*H05K 7/00* (2006.01)
*A47B 81/00* (2006.01)
*A47B 97/00* (2006.01)

(52) U.S. Cl. .................. 361/727; 312/223.2; 312/223.3; 361/679.02; 361/679.55; 361/724

(58) Field of Classification Search .................. 361/727, 361/679.02, 679.55, 724; 320/107, 111; 312/223.2, 223.3
See application file for complete search history.

(56) References Cited

U.S. PATENT DOCUMENTS

| 6,008,621 | A  | * | 12/1999 | Madison et al. | 320/107 |
| 6,218,796 | B1 | * | 4/2001  | Kozlowski | 318/280 |
| 6,511,039 | B1 | * | 1/2003  | Nash | 248/678 |
| 7,160,113 | B2 | * | 1/2007  | McConnell et al. | 434/365 |
| 7,325,891 | B1 | * | 2/2008  | Kinsley et al. | 312/257.1 |

* cited by examiner

*Primary Examiner*—Jayprakash N Gandhi
*Assistant Examiner*—Anthony M Haughton

(57) ABSTRACT

A cabinet for receiving and charging power to notebook computers comprises a cabinet body; a receiving space formed in the cabinet body; a plurality of drawers arranged longitudinally installed in the receiving space; each drawer being installed with a plurality of retainers; a power supply portion having a power source and at least one receptacle which is connected to the power source; the power source being connected externally to other power supply; a transformer receiving portion formed at a backside of each drawer being formed as a receiving space; and a control portion connected to the power supply portion for turning off the power unit at a setting time. Each retainer has an approximate V shape for receiving at least one notebook computer.

7 Claims, 5 Drawing Sheets

CABINET FOR RECEIVING AND CHARGING POWER TO NOTEBOOK COMPUTERS

FIELD OF THE INVENTION

The present invention relates to storage of notebook computers, and particularly to a cabinet for receiving and charging power to notebook computers which can make the notebook computers therein are arranged orderly and the space can be used efficiently. Moreover, the cabinet has a power unit which can charge power to the notebook computers therein.

BACKGROUND OF THE INVENTION

Notebook computers have become a trend for the application of the computers due to the convenience and compact size thereof. Some offices have many notebook computers. As a result, there is a necessity for a cabinet body who can store notebook computers massively.

In one prior art, a cabinet body is provided. The cabinet can locate a plurality of notebook computers. However the structure cannot provide a space for locating a plurality of notebook computers orderly. It is often that the notebook computers therein are arranged disorderly.

Furthermore, power charging is important to the notebook computers, while no prior art cabinet can provide the function of supplying power to the notebook computers.

SUMMARY OF THE INVENTION

Accordingly, the primary object of the present invention is to provide a cabinet for receiving and charging power to notebook computers which can make the notebook computers therein are arranged orderly and the space can be used efficiently. Moreover, the cabinet has a power unit which can charge power to the notebook computers therein.

To achieve above objects, the present invention provides a cabinet for receiving and charging power to notebook computers comprising: a cabinet body; a receiving space formed in the cabinet body; a plurality of drawers arranged longitudinally in the receiving space; the drawers being movable; each drawer being installed with a plurality of retainers; a power supply portion having a power source and at least one receptacle which is connected to the power source; the power source being connected externally to other power supply; a transformer receiving portion formed at a backside of each drawer which is formed as a receiving space; and a control portion connected to the power supply portion for turning off the power unit at a setting time. Each retainer has an approximate V shape so that the arrangement of these retainers provide a wavelike structure with a plurality of tips and a plurality of pits for receiving at least one notebook computer. A periphery of the cabinet body is formed with a plurality of heat dissipating holes for dissipating heat.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
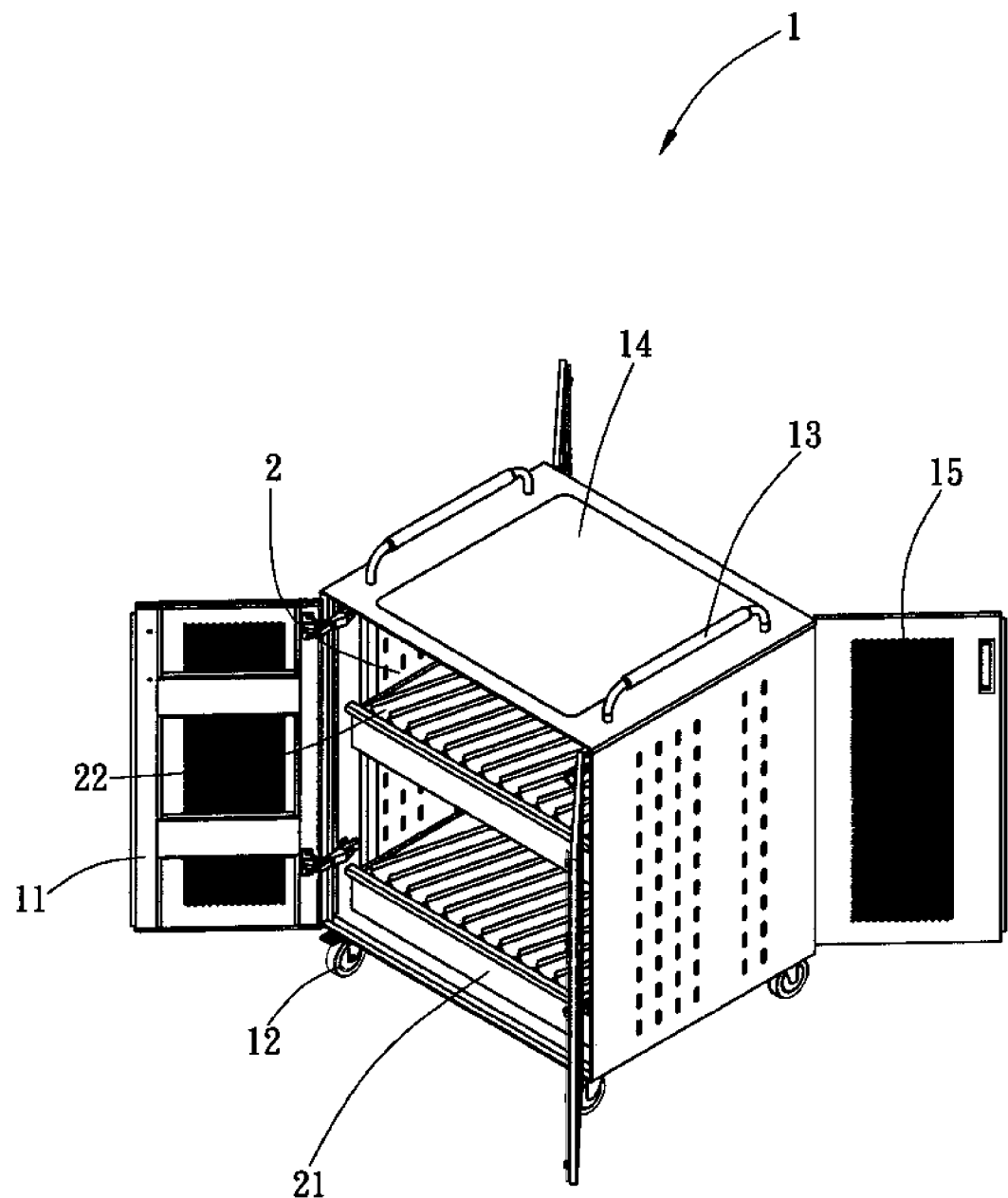
FIG. 1 is a front schematic view of the cabinet for receiving and charging power to notebook computers of the present invention.

Referring to FIG. 1, the cabinet for receiving and charging power to notebook computers according to the present invention is illustrated. The present invention has the following elements.

A cabinet body 1 has an approximately rectangular shape. Each of a front side and a rear side of the cabinet body 1 has a door 11. A bottom of the cabinet body 1 has a plurality of wheels 12 which rotate freely. Each door 11 has a handle 13. A topside of the cabinet body 1 has a stop pad 14 for providing friction force as an notebook computer 4 is placed thereon. A periphery of the cabinet body 1 is formed with a plurality of heat dissipating holes 15 for dissipating heat.

A receiving space 2 is formed in the cabinet body 1. A plurality of drawers 21 arranged longitudinally in the receiving space 2. The drawers 21 are drawable. Each drawer 21 is installed with a plurality of retainers 22. Each retainer 22 has an approximate V shape so that the arrangement of these retainers 22 provides a wavelike structure with a plurality of tips and a plurality of pits. The notebook computer 4 can be placed in the V shape area. The V shape structure has the advantage of retaining the notebook computer 4 in a stand state.

Figure 2:
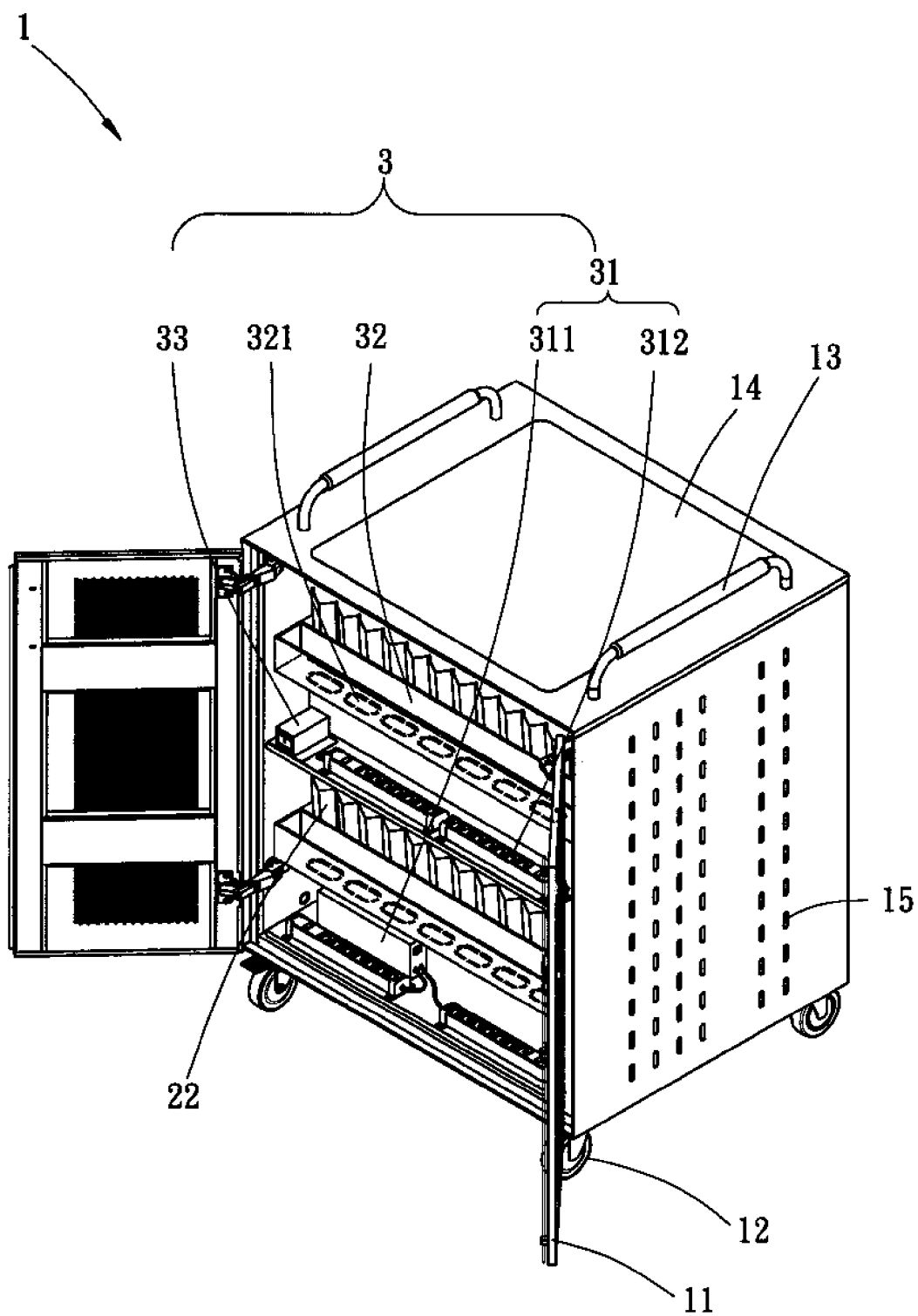
FIG. 2 is a backside view of the cabinet for receiving and charging power to notebook computers of the present invention.

Referring to FIG. 2 the structure of the power unit 3 is illustrated. The power unit 3 is installed at a backside of the cabinet body 1. The power unit 3 has the following elements.

Figure 4:
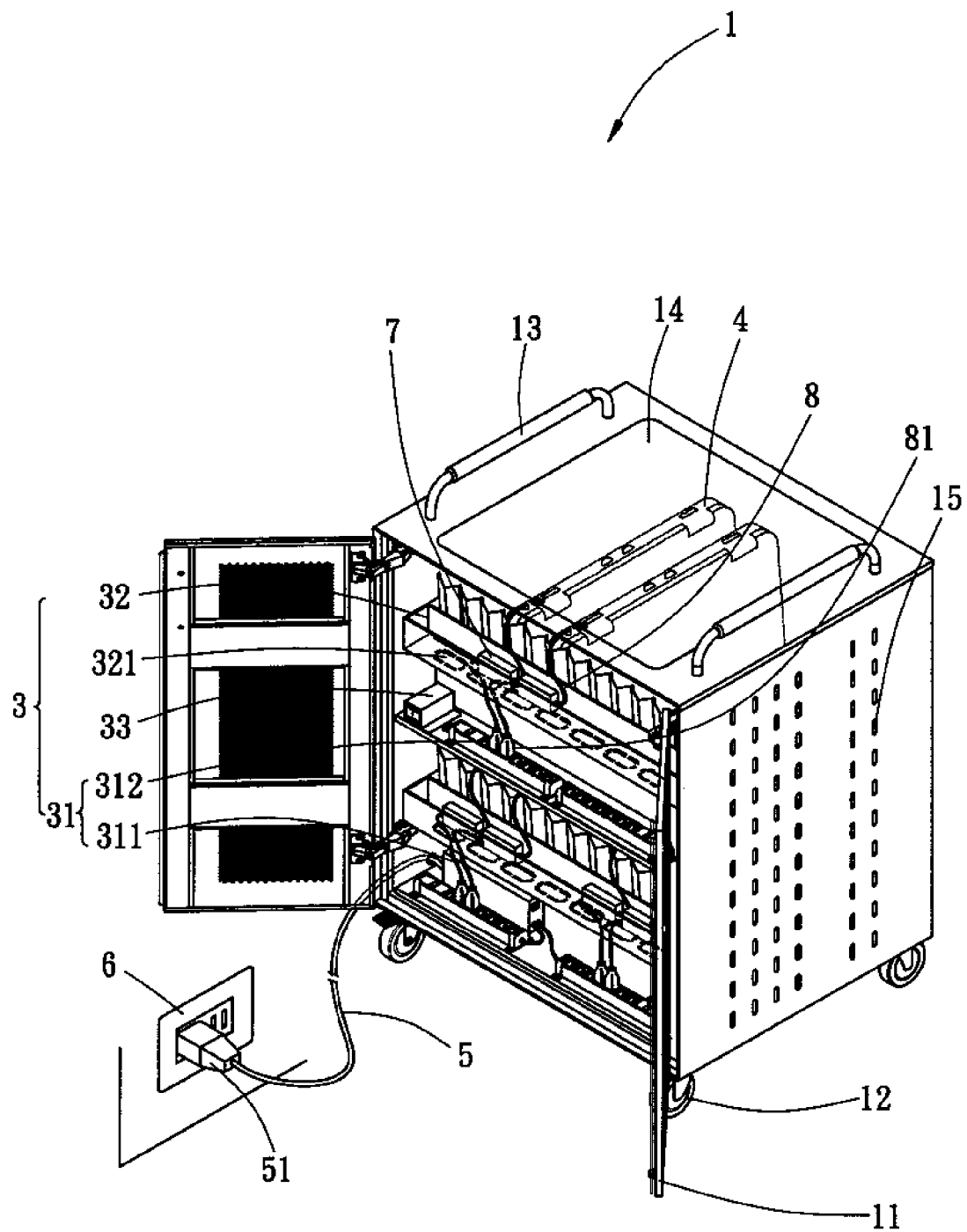
FIG. 4 shows another application of the present invention.

A power supply portion 31 has a power source 311 and at least one receptacle 312 which is connected to the power source 311. The power source 311 is connected externally to other power supply in the building for supplying external power to the cabinet body 1. In FIG. 4, it is illustrated that the power source 311 is connected to a receptacle 6 through a power wire 5 and a plug 51 connected to the power wire 5.

A transformer receiving portion 32 is formed at a backside of each drawer 21 which is formed as a receiving space. A plurality of through holes 321 is formed at a bottom of the transformer receiving portion 32 for locating the transformer 7 of the notebook computer 4. The plug 8 of the transformer 7 can be plugged into the receptacle 312 for getting power from the power source 311.

A control portion 33 is connected to the power supply portion 31 for turning off the power unit 3 at a setting time so as to prevent the notebook computer 4 from damage due to over-charge (too much power is supplied to the notebook computer 4). The heat dissipating holes 15 serve to dissipate heat due to the operation of the power unit 3.

Figure 3:
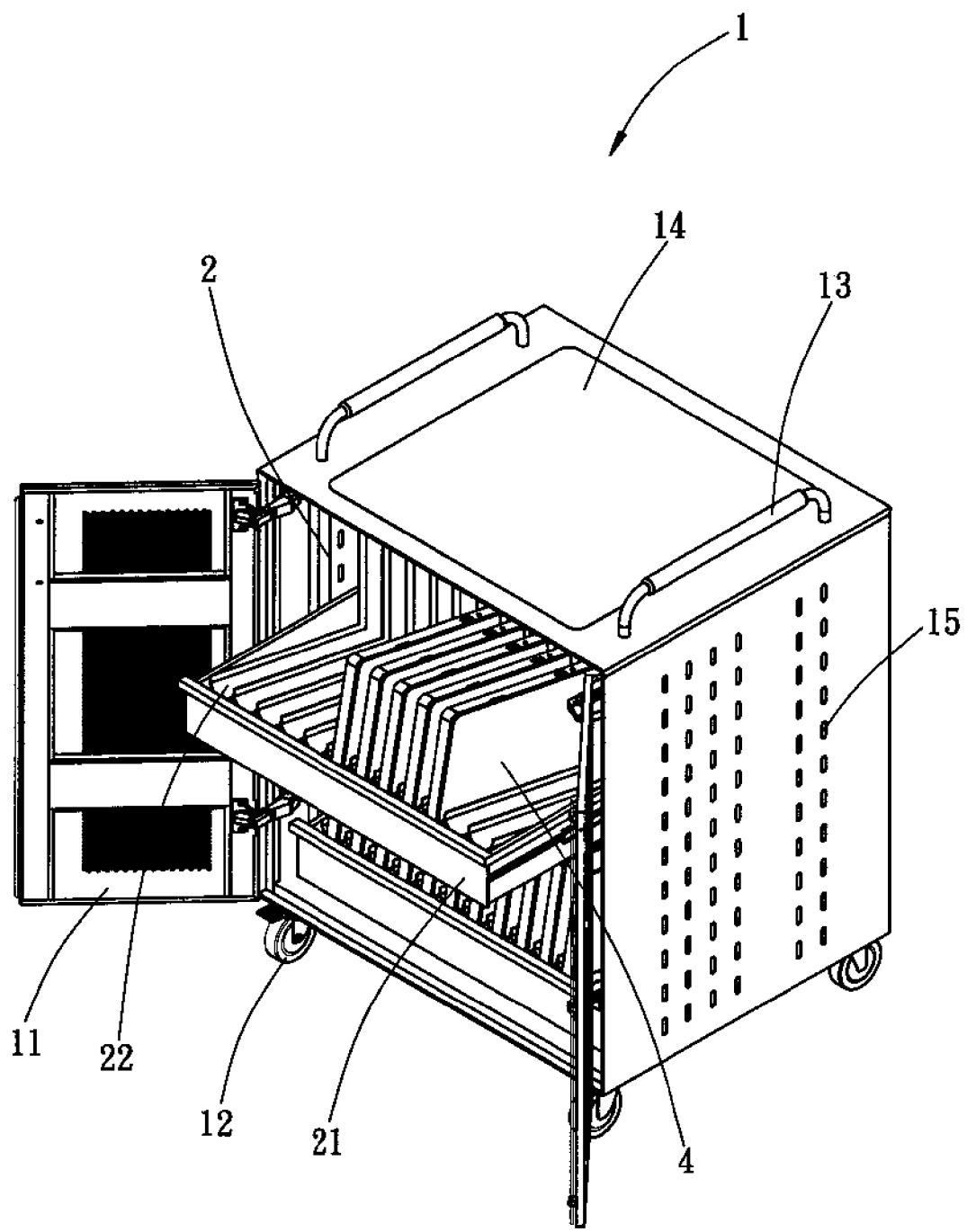
FIG. 3 shows the application of the present invention.
Figure 5:
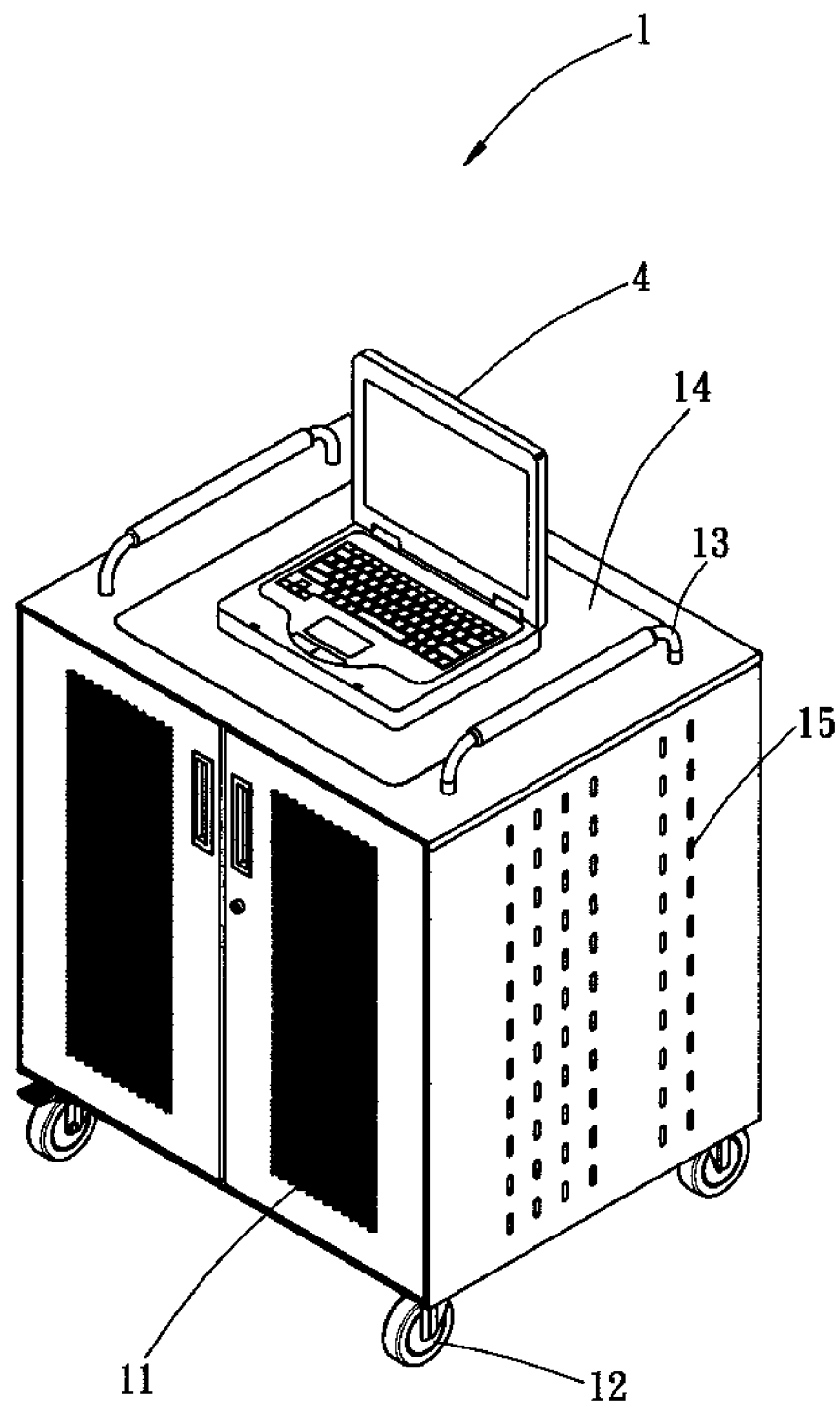
FIG. 5 shows that the cabinet body of the present invention is in a closing state.

Referring to FIGS. 3 to 5, the application of the present invention is illustrated. FIG. 3 shows that the receiving of the notebook computers 4 in the drawers 21. FIG. 4 shows the arrangement of the power unit 3. FIG. 5 shows the cabinet body 1 in a close state.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cabinet for receiving and charging power to notebook computers comprising:
   a cabinet body;
   a receiving space formed in the cabinet body; a plurality of drawers arranged longitudinally in the receiving space; each drawers being movable; each drawer being installed with a plurality of retainers for receiving multiple notebook computers;
   a power supply portion having a power source and at least one receptacle connected to the power source; the power source being connected externally to other power supply;
   a transformer receiving portion formed at a backside of each drawer; the transformer receiving portion being formed as a receiving space for receiving multiple transformers used to charge the multiple notebook computers; and
   a control portion connected to the power supply portion for turning off the power unit at a setting time so as to prevent the multiple notebook computers from damage due to over-charge.

2. The cabinet for receiving and charging power to notebook computers as claimed in claim 1, wherein each retainer has an approximate V shape so that the arrangement of these retainers provide a wavelike structure with a plurality of tips and a plurality of pits for receiving at least one notebook computer.

3. The cabinet for receiving and charging power to notebook computers as claimed in claim 1, wherein a periphery of the cabinet body is formed with a plurality of heat dissipating holes for dissipating heat.

4. The cabinet for receiving and charging power to notebook computers as claimed in claim 1, wherein the cabinet body has an approximately rectangular shape.

5. The cabinet for receiving and charging power to notebook computers as claimed in claim 1, wherein each of a front side and a rear side of the cabinet body having a door; and a bottom of the cabinet body having a plurality of wheels which rotate freely; and each door has a handle.

6. The cabinet for receiving and charging power to notebook computers as claimed in claim 1, wherein a topside of the cabinet body has a stop pad for providing friction force as an notebook computer is placed thereon.

7. The cabinet for receiving and charging power to notebook computers as claimed in claim 1, wherein a plurality of through holes being formed at a bottom of the transformer receiving portion for locating the transformer of the notebook computer; a plug of the transformer can be plugged into the receptacle for getting power from the power source.

* * * * *